Dec. 23, 1969    W. E. HOWELL    3,485,557
STEREONEPHOGRAPH

Original Filed Feb. 4, 1964    4 Sheets-Sheet 1

INVENTOR.
WALLACE E. HOWELL
BY Harry A. Herbert Jr.
and
Ruth Coolie
ATTORNEYS

Dec. 23, 1969     W. E. HOWELL     3,485,557
STEREONEPHOGRAPH
Original Filed Feb. 4, 1964     4 Sheets-Sheet 2
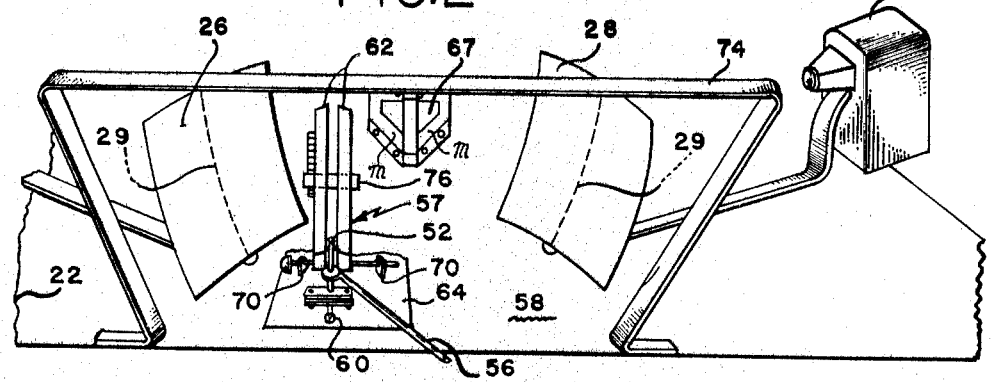
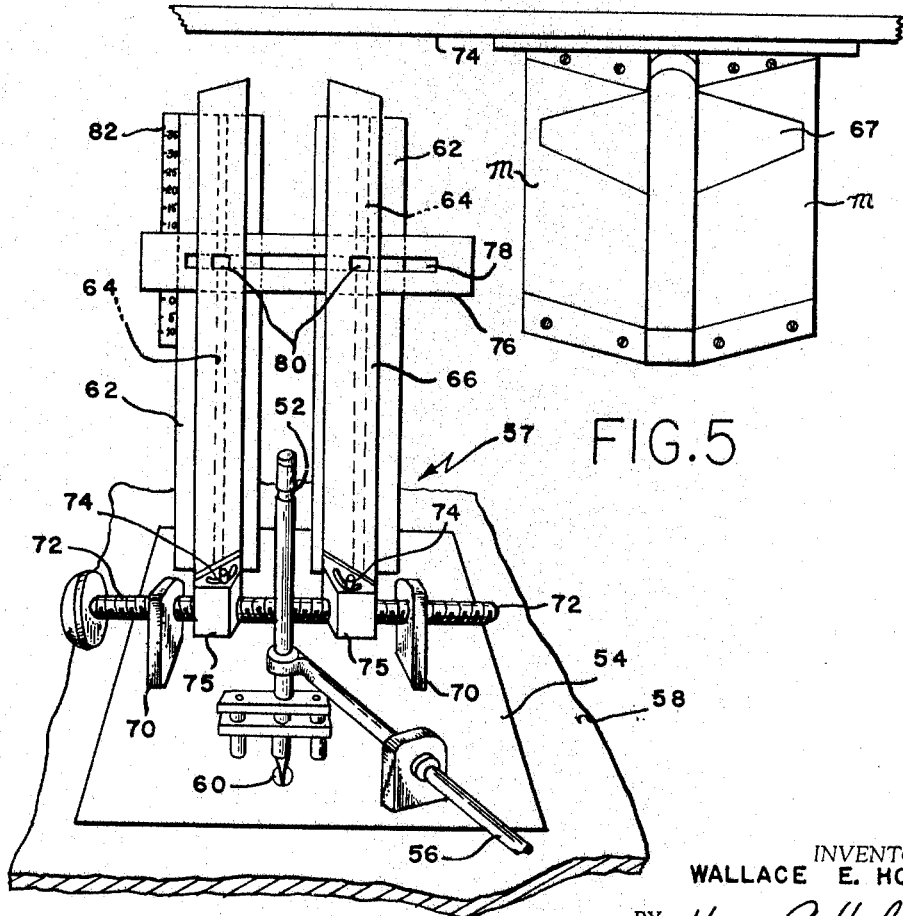
INVENTOR.
WALLACE E. HOWELL
BY *Harry A. Herbert Jr*
*Ruth Codier* and
ATTORNEYS Dec. 23, 1969  W. E. HOWELL  3,485,557
STEREONEPHOGRAPH
Original Filed Feb. 4, 1964  4 Sheets-Sheet 3
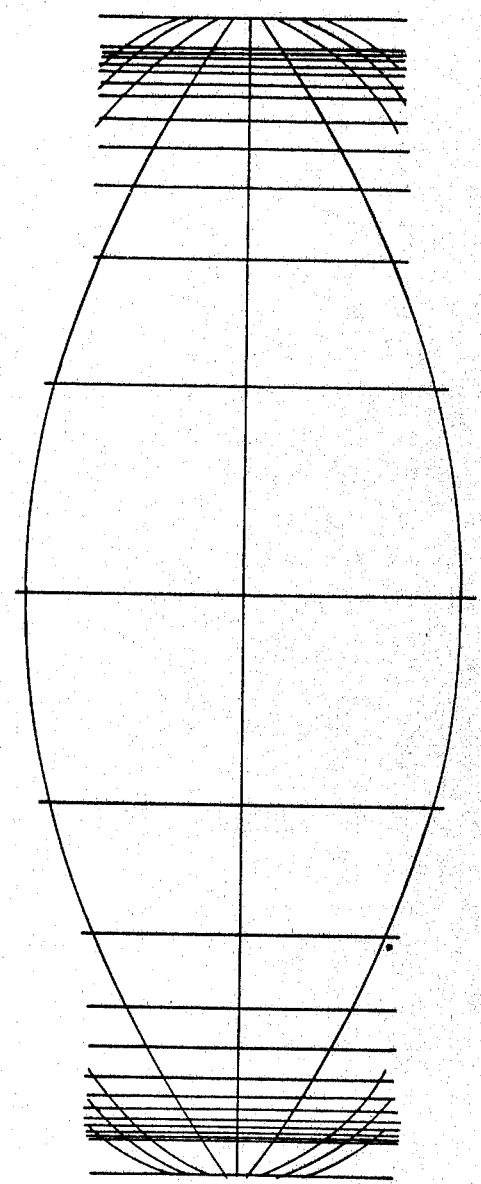
FIG.3-A
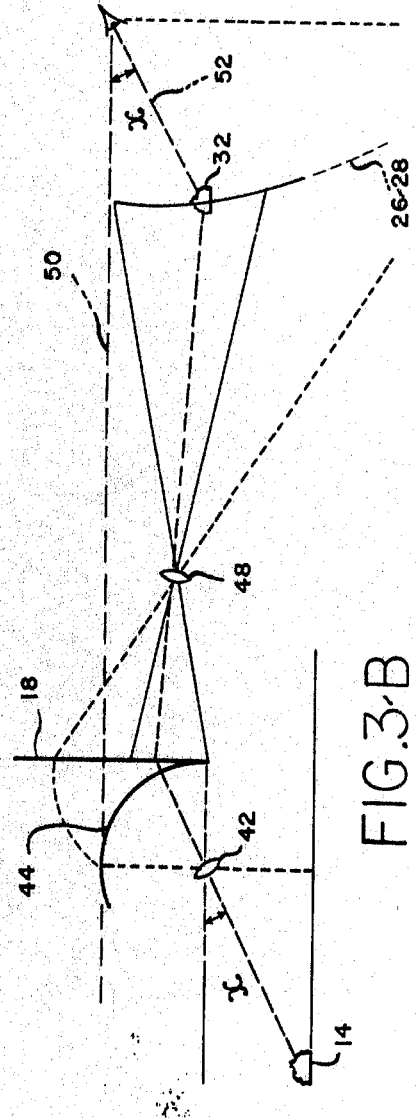
FIG.3-B
INVENTOR.
WALLACE E. HOWELL
BY Harry A. Herbert Jr
and
Ruth Coolier
ATTORNEYS Dec. 23, 1969     W. E. HOWELL     3,485,557
STEREONEPHOGRAPH
Original Filed Feb. 4, 1964     4 Sheets-Sheet 4
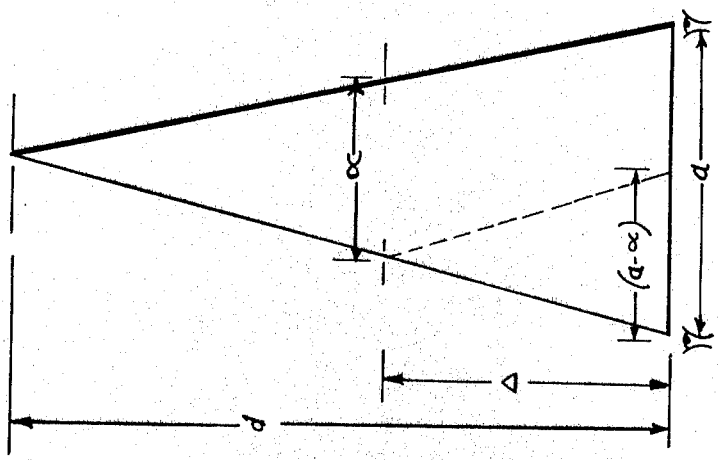
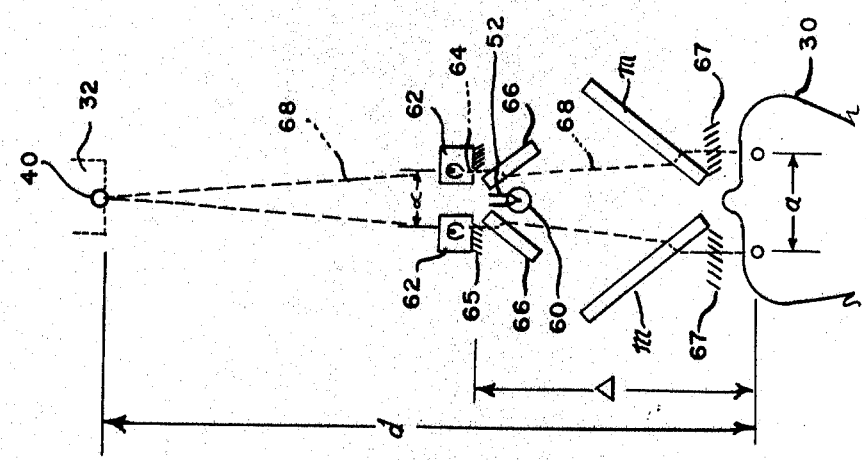
INVENTOR.
WALLACE E. HOWELL
BY Harry A. Herbert Jr
and
Ruth Cadier
ATTORNEYS

3,485,557
STEREONEPHOGRAPH
Wallace E. Howell, Lexington, Mass., assignor to the United States of America as represented by the Secretary of the Air Force
Original application Feb. 4, 1964, Ser. No. 342,576, now Patent No. 3,293,750, dated Dec. 27, 1966. Divided and this application Aug. 11, 1966, Ser. No. 572,174
Int. Cl. G03b *21/00;* G02b *27/22, 27/24*
U.S. Cl. 353—6                                                                 1 Claim

ABSTRACT OF THE DISCLOSURE

A device for taking stereoscopic pairs of cloud photographs and projecting these paired photographs stereoptically. The panoramic photographs are taken at right angles to the line of flight and at intervals. The projecting device incorporates a proportional relationship between these intervals and the distance between the eye pupils of the viewer. The pairs of photographs are projected onto the rear surface of translucent screens placed to the right and to the left of the viewer, and viewed by him from half-silvered mirrors reflecting the image from the opposite screen surface. The half-silvered mirrors enable the viewer to see the reflected image from the screens with each eye while at the same time constructing a single image through and beyond the mirrors. The resulting image created is a mappable virtual image in space to the mind of the viewer.

---

This is a division of application Ser. No. 342,576, filed Feb. 4, 1964, and issued on Dec. 27, 1966 as Patent No. 3,293,750.

The present invention relates to a stereonephograph, and more particularly to a device for taking stereoscopic photographs of clouds at altitudes well above the tops of these clouds and providing a device by means of which the cloudscapes thus photographed can be viewed stereoscopically and mapped. The components of the title word STEREONEPHOGRAPH are as follows: "Stereo" the quality which supplies perspective and depth, "nepho" deals with clouds, and "graph" with the mapping portion of the invention.

The cloudscapes photographed by means of the device of this invention represent by far the most extensive views of cloud systems for study which have sufficient resolution to permit the form and altitude of the clouds to be studied in detail. From these photographs, it is possible to make maps of the clouds covering substantial parts of weather systems such as cyclones and frontal systems. They also provide an important link between the very extensive but indistinct pictures provided by satellites and the appearance of the clouds from the ground or from conventional aircraft in which the view is too restricted for recognition of large-scale patterns. For this linking, information useful in analyzing satellite pictures is obtainable.

The instrument of the invention forms a stereoscopic image of clouds photographed from very-high-flying aircraft in such a way that maps of the cloudscape can be drawn, either in detail over small areas or over extensive flight paths, with contours and other three-dimensional representations. Various methods of orienting pairs of photographs so as to obtian an undistorted image were tried. In the course of these trials it was noted that nearly all cloudscapes seen from great altitudes contain strong clues as to what constitutes a horizontal surface, and a method was developed of orienting the pictures by comparing these clues with horizontal reference lines.

An object of this invention is to provide an instrument for preparing maps of clouds from horizon-to-nadir-to-horizon from panoramic photographs taken perpendicular to the line of flight in the course of these high-altitude flights.

Since the clouds change their shape, even in the short interval of time between one photograph and the next of a series, and since their outlines are often more or less vague, the methods of classical photogrammetry are extremely difficult and laborious to apply and require the repetitive measurement of a large number of points if the possibility of large errors due to cloud changes is to be avoided.

A further object of the invention is the circumvention of these difficulties by utilizing the phenomenon of stereoscopic vision. The mind has the ability to integrate two distinct images into a single three-dimensional stereographic image, accommodating itself to and suppressing the disturbing elements to a large extent and using all the elements of the image rather than a selected few in framing the stereographic image.

In thus utilizing the stereographic image this instrument follows the same principles used in the familiar stereoscope used extensively in interpretation of aerial photographs, and its more sophisticated descendant the stereocartograph, from which the stereogram may be transcribed to paper in the form of contour maps. The principal difference lies in the fact that stereo instruments previously used depend for correct positioning of the photographs on preliminary mapping of control points whose positions on the ground are known and whose images may be recognized on the photographs, while control points among the clouds are generally lacking. It is easy to show by experiment that the brain accepts uncritically a rather large deviation of the photographs from proper alignment and constructs from them a realistic-appearing three-dimensional image.

A further object of the invention is, therefore, the provision of a device which furnishes the image space with some sort of fixed framework, and brings the cloud image into consonance with this framework.

Experiments were conducted with a number of possible elements that could enter into the composition of such a framework, including the position of prominent cloud features as distant from the line of flight as possible (mapped by triangulation from the first and last photographs on which they appeared), an adjustable and movable illuminated vertical index, and the construction of a grid which when viewed stereoscopically gave the impression of a rectangular scaffolding occupying the image space. In the course of these experiments it was noticed that the most useful characteristic of the cloud photographs was not the presence of prominent features, but the fact that practically all cloudscapes contain numerous dependable clues as to what constitutes a horizontal surface. Sometimes these clues take the form of thin cloud sheets at a constant level around a group of large cumulus or cumulonimbus, or sometimes even the distant horizon. Obviously, there are occasions when false clues are present in the form of cloud sheets that are not horizontal, but from the samples we have worked with so far these do not pose much of a problem, and it has not been difficult to recognize and eliminate the false clues. Making use of this characteristic, the instrument has evolved in a form that presents the reference framework in the form of a simple "center stripe" which appears to the viewer as a horizontal line going outward along the center of the field of view at a level a selected distance below the eye level of the viewer. Alignment of the photographs is accomplished by bringing this line into parallelism with the horizontal planes identified by the mind from the clues present in the stereographic image. The center stripe is supplemented by an illuminated plumb line that may be moved about within the image space.

THE PRINCIPLE

The stereonephograph presents a stereographic image to the view of the operator in the form of a virtual image that appears as a scaled-down model of the original cloudscape. Superimposed on it is the image of an illuminated plump line, the device for creating which is connected to a stylus so that the apparent distance of the index from the operator is proportional to the distance of the stylus from a base line, the coefficient of proportionality being mechanically adjustable. When the plumb line is moved over the apparent cloudscape, the stylus draws a map of the motion.

A still further object of the invention is the provision of a device incorporating the principles set forth above and which includes an illuminated virtual image plump line or point, produced stereoscopically and movable along the stereoscopically produced cloud images, and a stylus attached to the plumb line to map the cloud contours.

A further object of the invention is the provision of a device for producing a stereoscopic image of cloudscapes from panoramic photographs taken at right angles to the line of flight and at intervals, the image being produced by a device which incorporates a proportional relationship between these intervals and the viewers or operators interocular distance.

A further object of the invention is the provision of a viewing and mapping device wherein each eye of the viewer sees an image in a half mirror, the image seen being one that has been projected on a transluscent screen, the transparencies used in each projector being taken at intervals along a flight path as above noted.

One of the important objects of the invention is the provision of cloudscape mapping means wherein the size of the cloudscape virtual image is controllable by the selection of intervals between the photographs made of the cloudscape, and further, the size of the map to be made from the fixed virtual image is variable by varying either the distance between the two illuminated elements which produce the point virtual image, or by varying their distance from the eyes of the operator.

These and other advantages, features and objects of the invention will become more apparent from the following description taken in connection with the illustrative embodiments in the accompanying drawings, wherein:

In the drawings:

FIG. 2 is a general perspective view of the stereonephograph, set up for viewing and map making;

FIG. 3a is a schematic representation of a geographic grid as if photographed by a panoramic camera;

FIG. 3b is a schematic vertical profile diagram of the sequence from the actual photographing of the cloudscape to the projection of the image;

FIG. 4a is a schematic diagram illustrating the principle of the plumb line and mapping stylus and the formation of a virtual image by viewing slits separately with each eye;

FIG. 4b is a schematic simplified geometric diagram involving the principles of the plumb line and mapping stylus; and FIG. 5 is a perspective view of the physical embodiment of the plumb line and stylus unit and showing also a more detailed view of the operator's positioning device.

THE STEREOSCOPIC IMAGE

Figure 1:
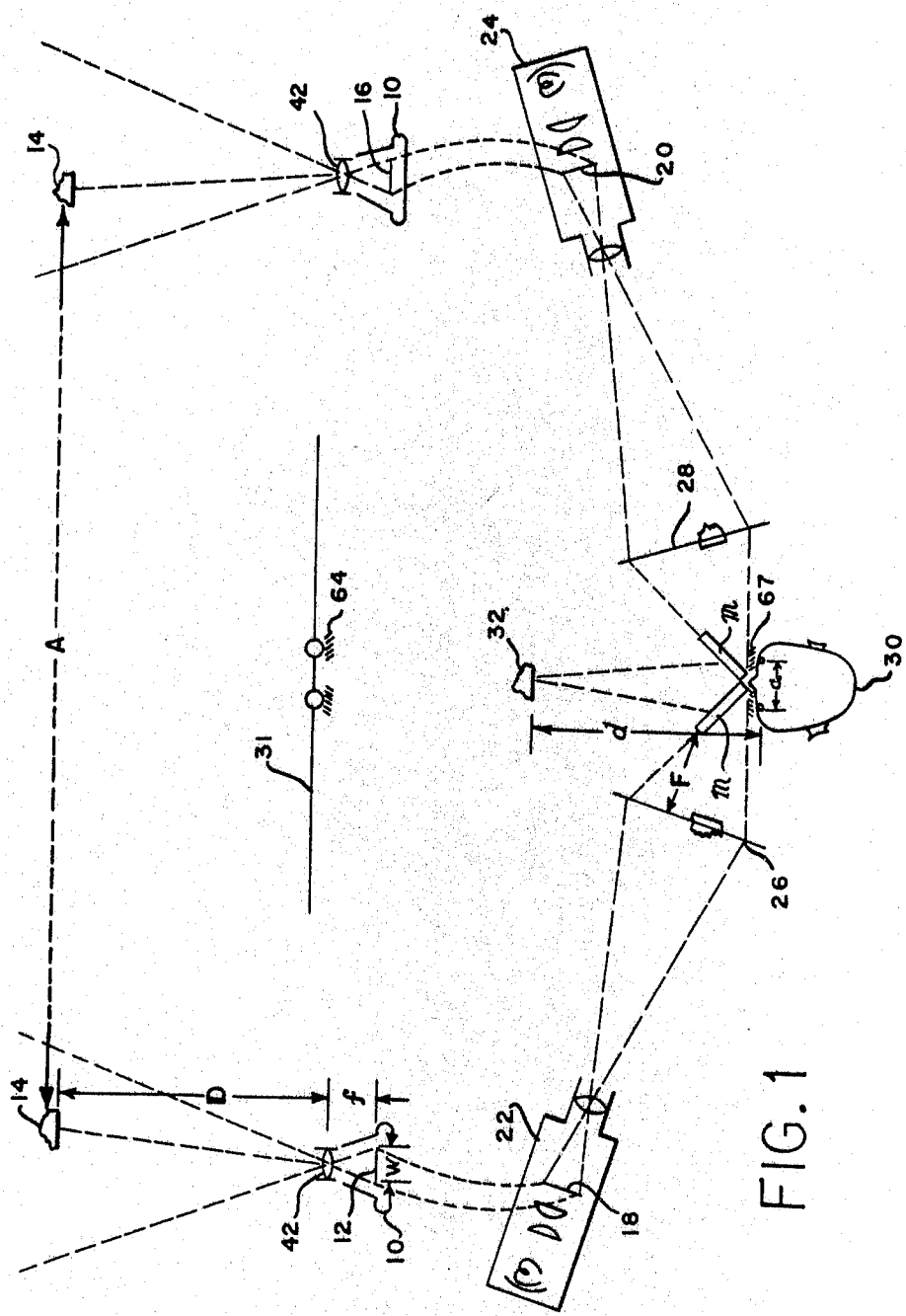
FIG. 1 is a schematic diagram illustrating the principles involved in the construction and operation of the stereonephograph and the production of an image.

The stereoscopic image is composed of two photographic images presented to the eyes of the operator in such a way that the situation is simulated wherein the operator views the original scene with one eye located at each of the two camera positions using for this purpose a system of projectors and mirrors as shown in FIGS. 1 and 2.

A camera 10 with a focal length $f$ cm. takes a photograph 12 of a cloudscape 14 from a position indicated at the left of FIG. 1, recording it on a width $w$ film. In practice a focal length of 7.62 cm. and a film width of 6 cm. was used. It is to be understood, however, that these dimensions may be varied without departing from the spirit and scope of the invention.

Subsequently, the camera 10 moves a distance A to the right and rephotographs 16 the same cloudscape 14. Contact transparencies 18 and 20 of these photographs are projected by the left and right projectors 22 and 24 respectively onto screens 26 and 28. These screens are viewed separately by the left and right eyes of the operator 30 in the half-silvered mirrors $m$. The half-silvered mirrors $m$ enable the operator to see the reflected image from the screens with each eye and at the same time construct a single image through and beyond the mirrors. The screens 26 and 28 are of a width W and are placed at a distance F from the left and right eyeballs respectively of the operator 30 so that the ratio $F/W$ of the viewing distance F to the image width W on the screen is the same as the ratio $f/w$ of the camera focal length $f$ to the image width $w$ on its film.

Directions of objects in the field of view relative to the camera axes are then reproduced in the directions of these same objects relative to the operator's visual axes, and the cloudscape is reproduced as a stereographic image with its apparent size reduced by the ratio $a/A$ from the original, where $a$ is the distance between the eyes of the operator.

The cloud 14 at a distance D from the camera 10 therefore appears to the operator as an image 32 at a distance $d = Da/A = 0$ from his eyes. See FIGURE 1.

In typical stereophotographs of clouds, for example, the distance A between adjacent camera positions is about 6 km., and by selection of pairs further separated in the sequence, it may be increased indefinitely. The interocular distance $a$ is typically about 6.4 cm. The scale reduction when adjacent photographs are used is therefore of the order of $1(10)^5$; a cloud at an actual distance of 100 km. will appear to be about 1 m. away.

RECTIFICATION OF THE PANORAMIC IMAGE

The photographs 12 which the present stereonephograph is designed to utilize are taken with a panoramic camera 10 that sweeps from slightly above one horizon, through the nadir, to slightly above the other horizon. Suppose the camera were to photograph a horizontal rectangular grid, situated below the camera a distance equal to the spacing between elements of the grid. FIGURE 3A is a representation of the image thus formed. By computation following established procedures, the grid can be corrected for curvature of the earth and refraction of the atmosphere.

These corrections were made on the assumption of an altitude of 70,000 ft. for the photographic airplane and 20,000 ft. for the grid, and a grid, was drawn using 6 km. as the unit of spacing, corresponding closely to the average spacing between successive picture-taking positions.

This grid was then developed as illustrated in FIGURE 3B to yield the vertical profile for the projection shown in FIGURE 1, correcting the distortion arising between the curved film plane 44 of the camera 10 and the flat film plane assumed by the transparency 18 when introduced into the projector.

In FIGURE 3B, the cloudscape 14 is photographed as if on a cylindrical film, which is flattened out and projected onto the curved translucent screen 26–28. The photograph is taken with the camera lens 42 tipped at a depression angle represented at X. A contact transparency made from the exposed, curved film segment 44, is laid out flat in the projector film holder. The projector lens 48 projects the cloud image 32 at a position on the screens 26–28, which reproduces the depression angle between the line of eye level and the line 52 of eye to projected image 32.

In use, the variable lens-to-screen distance occasioned by the shape of the screen did not produce objectionable loss of focus.

The center stripe

In experiments with the stereonephograph, grids were constructed and placed on the projection screens in such a way that the operator saw a series of virtual images of horizontal and vertical grid lines at various distances below and away from him, depending upon which pairs of lines forming the grid he chose to fuse. When the grid is reduced to a single pair of lines, one for the left eye representing a line extending outward to the horizon one unit distance below eye level and half a unit to the right, one for the right eye representing a line one unit down and half a unit to the left, they may be fused in only one way and appear as a line going outward to the horizon from a point directly below the bridge of the operator's nose and one unit distance down, where the unit distance is now the operator's interocular distance $a$ (in the average operator this is a point about at the bottom of the nose). If each eye is presented with two lines, let us say one that is one unit down and one that is two units down, each line seen by one eye may be fused with either seen by the other eye; three levels appear in the image space, a single line above and a single line below a pair of lines. As more lines are added, the number of possible fusions mounts very rapidly and the image space becomes populated by a confusing number of levels that are difficult to identify. In practice, a single pair of lines was found to serve best. Accordingly, transparent overlays were prepared that can be placed on the projection screens 26–28. These overlays provide a line 29 for each eye and present a single line appearing to go outward to the horizon from a point a selected distance below the operator's eye level. This line is drawn in segmented form (see 29 in FIGURE 2) so that it resembles the center stripe of a highway as seen by the driver of a car (except for being much closer to eye level), the length of each segment being one unit of distance.

The plumbline

If an illuminated vertical rod is placed in the field of view of the stereonephograph operator, it will be seen superimposed on the virtual image of the cloudscape. By attaching a stylus to the bottom of such a vertical rod, and moving it about in the image space, the features of the cloudscape can be mapped. This map will be on the same scale as the stereographic image, if the small error is neglected that arises from displacement of the lines of sight through the half-silvered mirrors. Although this is a possible mode of operation for map-making it is not a convenient one, for the scale of the map is fixed by the photographs and the dimensions of the stereonephograph and in practice is so large that it is unwieldly.

It is desirable, therefore, to provide the operator with means of further reducing the scale of the map. This is accomplished by providing the plumb line 40 illustrated in FIGURE 4A, the principles of which are illustrated in simplified form in FIGURE 4B. A pair of illuminated vertical slits 64 are presented to the view of the operator, each slit being covered by a strip of polarizer 65 and each eye by a piece of analyzer (Polaroid sheets) 67 in such a way that the right eye sees only the right slit, the left eye only the left slit. Since the lines of sight are displaced in passing through the half-silvered mirrors $m$, these lines are caused to pass also through a pair of compensating glass plates 66, which restore the lines to their original separation with reference to the base-line distance $a$. The slits 64–64 being separated from each other by a distance $\alpha$ and, being at a distance $\Delta$ from the operator's eyes, they appear to him as a single slit 40 at a distance $d$. By reference to the simplified diagram, FIGURE 4B, it can be seen that the scale of the real distance $\Delta$ of the slits from the operator, to their apparent distance $d$ is: $\Delta:d=(a-\alpha):a$. The triangles maintain their similarity no matter how the separation between the slits or their distance from the operator is varied. A device is shown in FIGURE 5 which provides attachment of a stylus 52 to the lamps forming the slits 64 so that they move about as a unit in the mapping area. A map of the motion of the virtual slit image can be drawn on a scale of: $1:a/(a-\alpha)$. With reference to the original cloudscape, the scale of the map is then: $1:A/(a-\alpha)$. The scale of the map to be drawn can thus be changed by moving the lamps 62 and changing the distance between the slits 64. In the instrument as now constructed, the quantity $a/(a-\alpha)$ can be varied from about 1.8 in infinity. The range of map scales that can be accommodated is therefore approximately 1:200,000 to infinity. The illuminated slits 64 are shown in FIGURES 4a and 5.

The actual embodiment of the plumbline and stylus unit 51 is shown in FIGURE 5. The device comprises a stylus 52 which is mounted on a transparent base 54 to be moved about in the mapping area by means of a rod or handle 56 for recording markings on the map paper, through an opening 60 provided in the base 54. A pair of vertical, elongated light sources 62 are mounted on the base 54 to move about the mapping area. Each light source 62 is provided with a vertical slit 64 shown in dotted lines in FIGURE 5.

The compensating plates 66 are also carried about on the base 54 and are interposed, as shown in FIGURE 4A into the operator's line of vision represented by the dotted line 68 between the half mirrors $m$, and the illuminated slits 64. Support for the plates 66 and adjusting means, both for adjusting their horizontal distance apart, and the angularity of each may be accomplished in any desired manner, for example:

Journal supports 70 rigidly secured to the plate 54 support the screw 72, which is provided with right and left hand screw threads on opposite ends. Brackets 74, secured to the lower ends of the plates 66, have angular adjustment to the blocks 75. The blocks 75 have bores which are internally screw threaded to receive and engage the right and left hand threads of the screw 72.

The illuminated plumbline device is equipped with a vertically adjustable runner or masking plate 76 whose function is to mask the slits to present only a small portion of the plumbline to the operator's view at a certain distance below eye level. The runner or masking plate 76 comprises a metal or other opaque strip extending horizontally across the two illuminated slits 64 to obscure the portion of the slits within the operator's line of vision.

A horizontally extending opening 78 in the runner 76 allows the operator to view only a spot of light 80 which moves, as the stylus 52 is moved, along a true horizontal plane in the image space. The lamps 62 are so mounted that their distance apart may be varied for changing the scale of the map to be drawn as above described.

The runner plate 76 may be moved vertically by any expedient means. A scale 82 is provided to indicate the vertical displacement.

Viewpoint fixation

Most optical instruments are designed with an exit pupil which, in use, coincides with the pupil of the user's eye and serves to fix the viewpoint with respect to the optical elements of the system. In principle, fixation of the viewpoint is necessary likewise in the stereonephograph if the stereographic image is to reproduce for the operator the angular relationships that the original cloudscape held for the camera positions. The instrument was originally designed to simplify the problem of reproducing these angular relationships by allowing the operator to view the stereographic image directly rather than through a system of lenses, and in the ideal situation the eye position should be represented by the center of rotation of the eyeball rather than by a fixed position of the pupil. In initial experiments with the instrument, the viewpoint was fixed by simple peep-holes, but after further experience these were discarded in favor of a system of ranging points and a headrest. The ranging points consist of a pair of illuminated apertures 63 mm. apart, one placed directly in front of each eye and covered with Polaroid sheet polarizers indicated at 67 in FIGURES 4a, 5 and 6 so that each eye sees only the aperture in front of it, and points marked on the translucent projection screens 26 and 28 where they also appear to be directly in front of the operator's eyes. Since these two pairs of points are at different distances, they appear superimposed only when the eyes are in correct position. A headrest 69 helps the operator to keep his head in this position. The magnitude of errors arising from departure of the operator's eyes from the correct position are small; errors in the apparent position of the plumbline are in proportion to the difference between the distances eye-to-screen and eye-to-plumbline, and the instrument is so constructed that for most mapping these distances are of the same order of magnitude. For the same reason the plumbline appears sharp, through most of its range of travel, to an eye focused on the projection screen; and in practice no difficulty in identifying the position of the plumbline has been experienced even when it is so close as to appear somewhat blurred since this position means generally that the ocular convergence is also great.

ORIENTATION OF THE PHOTOGRAPHS

Reference points

As described in the preceding section, the stereonephograph is provided with a pair of ranging apertures provided by the analysers 67 matched with a pair of range points on the projection screens that define straight-ahead level lines of sight in line with the operator's eyes. These may be supplemented by horizontal lines 29 drawn at eye level on the projection screens, and by lines representing the apparent horizon and the center stripe of the grid of FIGURE 3a.

Effects of lateral image displacements

Reference grids may be placed on the projection screens, as described in the previous section, so that they form a stereographic image of a rectilinear grid such as the one shown in FIGURE 3a on a level geographic surface, a certain distance below eye level, extending to the horizon. If these grids are now displayed so that their images as seen in the mirrors move toward each other, the vanishing point of the grid appears to rise and move toward the observer, the grid slopes upward and contracts in the to-fro direction. If the center stripe reference line is not in the field of view, the mind tends strongly to accommodate itself to this distortion and is reluctant to recognize it; but with the center stripe also presented, the distortion of the grid is at once obvious. If the grids are displaced in the opposite direction, the vanishing point of the grid appears to sink and recede, the grid slopes downward away from the observer and expands in the to-fro direction, so that the vanishing point of the grid appears to be beyond the vanishing point of the center stripe. The accommodation of the eye and mind is such that a point at an infinite distance, to which the lines of sight are parallel, appears nearer than the vanishing point of the grid if the lines of sight to the latter diverge.

Effect of vertical image displacements

If the reference grids are displaced upward from their correct position, the stereographic image of the grid rises above the center stripe but the apparent distance of the vanishing point is not affected. The grid can be made to sink back to the level of the center stripe by increasing the separation of the images, but at the same time the grid recedes and expands in the to-fro direction so that when it parallels the center stripe its vanishing point appears to be beyond the vanishing point of the center stripe. Conversely, lowering the grids from their correct position causes it to sink without receding, and by decreasing the image separation the grid can be made to shrink in the to-fro direction as it rises back to parallelism with the center stripe, its vanishing point then being nearer than that of the center stripe.

Orientation of the photographs

The photographs of actual cloudscapes contain no reference lines that can be treated as the grid was treated in the previous paragraphs. To a first approximation, however, the apparent horizon in the photograph can be taken as identical with that of the corrected geographic grid; each of the stereoscopic pair is adjusted in its projector so that the apparent horizon coincides with the appropriate reference line. The operator then varies the separation of the images back and forth, causing the stereographic image to rise-approach-contract and sink-recede-expand until he brings the horizontal planes as indicated by the clues mentioned earlier as nearly as possible into parallelism with the center stripe 29. As an aid in making this adjustment, it is sometimes helpful to intersect the center stripe 29 with the plumbline and observe the displacement of the cloudscape with reference to this intersection. With a little practice, an operator can repeat the adjustment of a stereoscopic pair with a reproducibility consistently smaller than errors arising because of uncertainty as to the airplane's position. If, however, the apparent horizon in the photographs is far above or below that for which the reference line is computed, the distortion described in the previous paragraph will occur; if the horizon is nearer (less depressed) than the computed one, the photograph will be set too low and when adjusted by its level-clues its distance scale will be foreshortened so that distant clouds appear nearer than they should. This distortion cannot be corrected without reference to other photographs, as will be further discussed in a later section.

MAPPING FROM THE PHOTOGRAPHS

Mapping from a single pair of photographs

Once a stereoscopic pair of photographs has been oriented, as discussed in the previous section, the stereographic image 32 is presented essentially undistorted to the view of the operator together with the center stripe 29. The scale of the map to be made is determined by means of the relationships described above, and the distance between the slits of the plumbline is set accordingly. If the cloudscape to be mapped is a very distant one and the desired map scale is very small, the separation A between camera positions may be increased by selecting a pair of photographs separated by one or more in the sequence. Then, by moving the plumbline so that it follows the features to be mapped, and scribing its motion with the stylus, a map of these features is produced. In addition to mapping the vertical projection of cloud features, the vertical distance below the airplane may be measured by use of the calibrated runner 76 on the plumb line 40, at least in the foreground portion of the image; in the distant parts, such measurements must be corrected for the curvature of the earth and for atmospheric refraction.

A map prepared from a single pair of photographs is especially appropriate for representing in detail such features as the positions of individual cumulus clouds along cloud streets, the spacing of waves that may appear in one or two directions in stratocumulus and altocumulus cloud decks, the extent of middle-level cloud decks spreading from cumulonimbus, etc.

Mapping from a sequence of photographs

The map made from a single pair of photographs is without controls except for those arising internally from the position of the apparent horizon and the horizontality clues, and those derived from aeronautical information regarding the altitude, heading, and course of the aircraft supplemented in some instances by identification of terrain features when these are visible in the photographs. When a map is made from each successive pair of photographs in a sequence, it cannot be assumed that the center stripes of succeeding stereographic images will be parallel. Maps prepared from successive pairs of photographs will therefore, in general, be displaced not only horizontally from each other along the line of flight but also rotationally, occasioned by changes of heading of the airplane. Since each pair of photographs yields one map of the cloudscape to the left of the line of flight and one of the cloudscape to the right, the rotations of these left and right maps between succeeding pairs will be equal and opposite.

The following procedure has been adopted on a trial basis for mapping a sequence of stereo pairs. First, from the flight log a mean heading and a mean photo-to-photo distance is determined, and the flight path of the airplane is mapped at the appropriate scale, showing the approximate position midway between each pair of photographs. (Usually, in order to make the map easier to handle, only one side of the line of flight is mapped at once, and the flight path is drawn near the edge of the work sheet.) The work sheet is then placed on the mapping table of the stereonephograph, with the mapped position of the nadir point for the first photo pair coincident with the observer's subocular point. The first pair of photographs is set in the projectors 22 and 24 and levelled carefully by reference to the horizon. If the horizon is missing in one of the pair because of banking of the airplane, this one is levelled by careful comparison of features near the horizon with corresponding features on the other. The pictures are then moved horizontally relative to each other until the center stripe appears to be level when compared with the cloudscape; the various clues of horizontality are integrated in judging the level appearance of the center stripe. The orientation of the image 32 is then checked by setting the runner 76 of the vertical index 82 at the height of some prominent horizontality clue, such as the top of a stratiform cloud deck, and moving it about within the picture space, side to side as well as to and fro. If it appears to rise above or sink below the horizontal as it moves from side to side, the levelling of the photographs is rechecked. Once the operator is satisfied with the orientation of the photographs, he maps the position of a few prominent, distinctive features in the foreground and middle distance that will be easily identifiable on succeeding photographs, and then proceeds to fill in as much detail as he desires, depending upon the purpose of the map. If the highest possible equality of map is to be made, he then advances the photographs in the projector by one frame, so that the leading picture of the first pair becomes the following picture of the second, and repeats the process of orientation as before. He then moves the map forward by a distance corresponding to the distance between photographs, placing the mapped portion of the next nadir point coincident with the subocular point, and then proceeds to compare the mapped position of the prominent check points previously selected with positions in the stereoscopic image. If they coincide closely, he proceeds with the mapping as before, selecting additional check points on the leading side of the picture as may be necessary, and filling in details. If the mapped check points fail to coincide with their images, he first attempts to bring them into adjustment through a slight rotation of the map, which would be necessary if the heading of the airplane had changed slightly between photographs, and by a slight to-fro displacement of the map, which would be necessary if the airplane had drifted sideways with respect to the clouds. If these fail to achieve satisfactory coincidence between map and image, he changes the relative horizontal placement of the photographs slightly, remaining within the range where the center stripe is not thrown unmistakably out of horizontal, until the coincidence is the best he can achieve.

Since the orientation of the photographs is done with a certain degree of subjectivity, there is in general some personal bias that results in a systematic error in the horizontal setting of the stereoscopic image which results in a corresponding distortion of the scale; if the tendency is toward overconvergence, the image is unduly reduced in size in its distant parts, and underconvergence produces the opposite error. As successive pairs are mapped, systematic overconvergence will appear as a tendency of the map of the flight path to turn toward the side being mapped or as a tendency for successive mappings of the position of a check point to advance along the line of flight, or both. Our experience indicates that by paying attention to these clues the operator can keep his personal errors at a satisfactory minimum. Depending upon the requirements for accuracy, the continuity of the cloud forms, etc., it is possible for use only every second pair of photographs, or even up to every fifth pair, in preparing the map, instead of every successive pair.

When both right and left sides of the flight path have been mapped by the procedure described above, the data are traced from the work sheets onto a master sheet embracing both sides of the flight path, and details too close to the flight path to be mapped directly by the stereonephograph are filled in by inspection from the photographs, using the modified Canadian grid illustrated in FIGURE 3A as an overlay.

Although the invention has been described with reference to particular embodiments, it will be understood to those skilled in the art that the invention is capable of a variety of alternative embodiments within the spirit and scope of the appended claims.

I claim:
1. In a device for creating and mapping a virtual cloudscape image, two photographic transparencies taken at a known interval along a flight path and at right angles thereto, cloudscape images on each of said transparencies, a right hand projector for projecting one of said transparencies, and a left hand projector for projecting the other of said transparencies, a pair of translucent screens each placed in front of one of said projectors so that the image is projected both onto the screen and through it to a half-silvered mirror means and to an eye of an opera- tor, said half-silvered mirror means comprising a right hand half-silvered mirror and a left hand half-silvered mirror so located as to reflect simultaneously the two projected images from the screen, to the right and left eyes respectively of an operator thereby enabling the operator to see the reflected image from the screens with each eye and at the same time construct a single image through and beyond the mirrors whereby a single mappable virtual image is formed in space to the mind of the operator, said virtual image bearing a size relationship to the actual cloudscope equal to the relationship of the operator's interocular distance to the above noted interval along the flight path at which the photographs were taken.

References Cited

UNITED STATES PATENTS

| | | | |
|---|---|---|---|
| 1,932,029 | 10/1933 | Wright. | |
| 1,956,822 | 5/1934 | Borden | 350—137 |
| 2,045,119 | 6/1936 | Carpenter | 352—62 |
| 2,339,822 | 1/1944 | Blaricon et al. | 350—137 |

NORTON ANSHER, Primary Examiner

R. M. SHEER, Assistant Examiner

U.S. Cl. X.R.

350—136, 138